F. H. RICHARDS.
TYPOGRAPHIC MACHINE.
APPLICATION FILED OCT. 18, 1902.

919,221.

Patented Apr. 20, 1909.
6 SHEETS—SHEET 1.

Fig. 1.

Witnesses:
Caldam C Fuss
N. C. Abbott

Inventor:
F. H. Richards

F. H. RICHARDS.
TYPOGRAPHIC MACHINE.
APPLICATION FILED OCT. 18, 1902.

919,221.

Patented Apr. 20, 1909.
6 SHEETS—SHEET 4.

Witnesses:

Inventor:

F. H. RICHARDS.
TYPOGRAPHIC MACHINE.
APPLICATION FILED OCT. 18, 1902.

919,221.

Patented Apr. 20, 1909.
6 SHEETS—SHEET 6.

Witnesses.

Inventor:

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 919,221.           Specification of Letters Patent.          Patented April 20, 1909.

Application filed October 18, 1902. Serial No. 127,828.

*To all whom it may concern:*

Be it known that I, FRANCIS H. RICHARDS, a citizen of the United States, residing at Hartford, in the county of Hartford and State of Connecticut, have invented certain new and useful Improvements in Typographic Machines, of which the following is a specification.

This invention relates to typographic machines and embraces an organization of mechanical elements for selecting, positioning and securing a member from a number of working members and feeding to it its work.

In carrying out my invention if the working members employed are type - forming dies the series of dies may be so arranged that any selected die may readily be brought into a general working point or position, and the dies may be mounted upon a carrier or head having compound movements whereby each die may be brought to such point.

The head, if desired, may be a hollow cylinder and the dies arranged about the periphery thereof. With a considerable number of dies space will be saved by arranging them in several rows about the perimeter of the cylinder, and for expediency in selecting the dies the rows will be regular, making circular and straight rows. Any convenient means may be employed for bringing the selected die into the desired position and for indicating to the operator which die is at such position.

To bring the die and its work together for the purpose of producing an impression upon the work, which may be a type-blank, suitable mechanism may be employed for advancing, at the proper moment, a carriage having a blank-holder thereon. A train of suitable gearing held stationary against the movement of a friction driving wheel may be employed, which may be released to the influence of the driving wheel after the selected die has been properly brought into position. The blank may be supported in such a holder of a carriage and be so mounted that some suitable device, as for instance cams upon a shaft connected with one of the wheels of a train of gear, will raise and lower the type-blank carriage once during each operation, when the train of gear will automatically be brought to rest. For the purpose of giving peculiarly beneficial results and permitting the die to sink into the blank and make a clean cut, efficient type, the type-blank may be given other movements than the movement of the direct feed and may be oscillated on an axis substantially coincident with the point of contact between die and blank during its movement toward and while in engagement with the die. Such operation may be imparted by an eccentric in gear with the advancing means and so timed that the oscillations will commence before the die and blank have come into contact and will continue during the major part of the advance of the blank, but will cease before the blank has been raised to its extreme height and will hold the blank in a position perpendicular to the contemplated printing face of the type being formed, to the end that the last advance movement of the type will produce a perfectly square printing face, and may embody a cradle supported on a carriage and holding the blank, an eccentric for oscillating the cradle and cams for raising and lowering the carriage. The eccentric may be driven by a shaft in gear, by high speed gears, with a mutilated gear having a plane portion and in mesh with a driving mutilated gear, and the cams may be driven by a shaft having a gear-wheel in gear with a mutilated gear in mesh with the mutilated driving gear and so arranged that the teeth on such driving gear will start the oscillation prior to the starting of the cams and will lock the cradle against oscillation prior to the lowering of the cradle, and the cams will be locked after the carriage has been lowered, the toothless portions of the gears coming in contact causing the locking. A suitable escapement permitting the operation of the train of interrupted gears may be utilized for causing the oscillation and the elevation at the desired periods.

During the advance movement of the blank against the die the die may be supported against such movement. The oscillation of the blank will have a tendency to jar or move the die, although its carriage may be very accurate and nicely positioned, to which end suitable means for engaging and positively holding the die may be employed. The dies may be provided with stems passing through the walls of the cylinder, provided a cylindrical form of carriage head is employed, and there may be an arm arranged to engage the projecting or protruding end of the die and securely hold it against the direct advance movement of the blank and also against movement incident to oscillation. Any convenient means may be employed for actuating the arm, either automatically or by hand, and it may be connected up with a series of links constituting a toggle or system of linkage whereby it may be locked after it has engaged the die. For precise alinement of the type the protruding ends of the die may be made tapering or conoidal and the arm be provided with an opening of corresponding shape, whereby after the die has been brought into the general working position or point by the selector the end of the arm will engage the die and move it one way or the other to bring it to the precise working point. If such opening in the arm is made deeper than the length of the die extensions there will be a certain amount of wedging and spring action of the parts at the locking, so that any wear incident to use will be compensated for, so when one part wears more than another the locking means will readily adjust itself to such wear and the precision of the machine be maintained. Suitable means will also be employed for advancing the blank carriage or carrier step by step if it is intended to use a blank upon which a line of type are to be formed, and such device may be operable from the main driving-shaft and controlled by the means for raising and lowering the blank, permitting the carriage to move forward one step after the blank has been raised and lowered each time.

In the drawings accompanying and forming part of this specification an embodiment of my invention is illustrated, wherein—

The device is shown as mounted upon a framing, designated in a general way by A and which provides suitable journal bearings b for the driving-shaft 11, upon which is shown mounted a friction pulley 12 held between disks 13, 14, one of which is pinned to the shaft and the other of which is loose thereon. Suitable friction disks 15 are interposed between the disks 13, 14 and the pulley. The loose disk 14 is shown as pressed against the pulley by means of a suitable spring 16 which bears against an abutment upon the driving-shaft, in the present instance shown as a split nut 17 provided with a clamping screw 18. The driving-shaft is held in an idle position by means of an arm 19 thereon engaging an escapement 20, which may be operated from some convenient part of the machine by some suitable device, in the present instance shown as a key 21 mounted upon a bell-crank 22, which is connected by means of a pitman 23 to an arm 24 fast upon a rock-shaft 25 upon which the escapement 20 is also mounted. A suitable spring 26 may be employed for returning the parts to their normal position after the operation.

Fast upon the driving-shaft is shown a wheel 27 provided with teeth 28 upon a portion of its periphery, a portion 29 of the periphery being shown as plain. Mounted in suitable bearings in the framework is a stub shaft 30 bearing a pinion 31 provided with teeth 32 upon the major portion of its periphery and which in the present instance are shown of a number equal to the teeth upon the wheel 27 and are so located as to mesh therewith. The wheel 31 is also provided with a plain concave portion 33 for permitting the free passage of the plain portion 29 of the wheel 27 and for locking the wheel 31 against movement. The wheel 31 is provided with a finger 34, which is adapted to lie over the wheel 27 and be engaged by a stud 35 thereon at the moment when it is desired to start the wheel 31 rotating to cause its gear to mesh with the wheel 27.

The dies in the present instance are shown as arranged upon a die-carrier consisting of a hollow cylinder 40, the dies 41 projecting from the outer perimeter thereof and having shanks 42, which may be square if desired, and pass through the cylinder 40 and terminate on the inside thereof, forming lugs 43, in the present instance shown as tapering or conical. The shanks are shown as held in position by keys or pins 42'. The dies are shown as arranged upon the cylinder in rows parallel with the axis thereof, there being shown in the present instance thirty-two dies formed in eight rows with four dies in a row, this number having been selected in the present instance arbitrarily. The inner end of the die-carrier comprises a head 44 provided with a hub 45 mounted upon a shaft 46 which has suitable bearings in the frame of the machine and is provided with suitable means for operating it, in the present instance comprising a handle 47 so located that the carrier may be rotated and reciprocated, giving a compound movement to the set of dies.

Some suitable indicating device may be employed for showing which die is in the working position, which in the present instance comprises a cylinder 48 mounted upon shaft 46 and bearing characters or other devices corresponding with or indicating the characters of other devices upon the dies or otherwise indicating the die, which in connection with a pointer 49 will show which character is at the working point.

Figure 1:
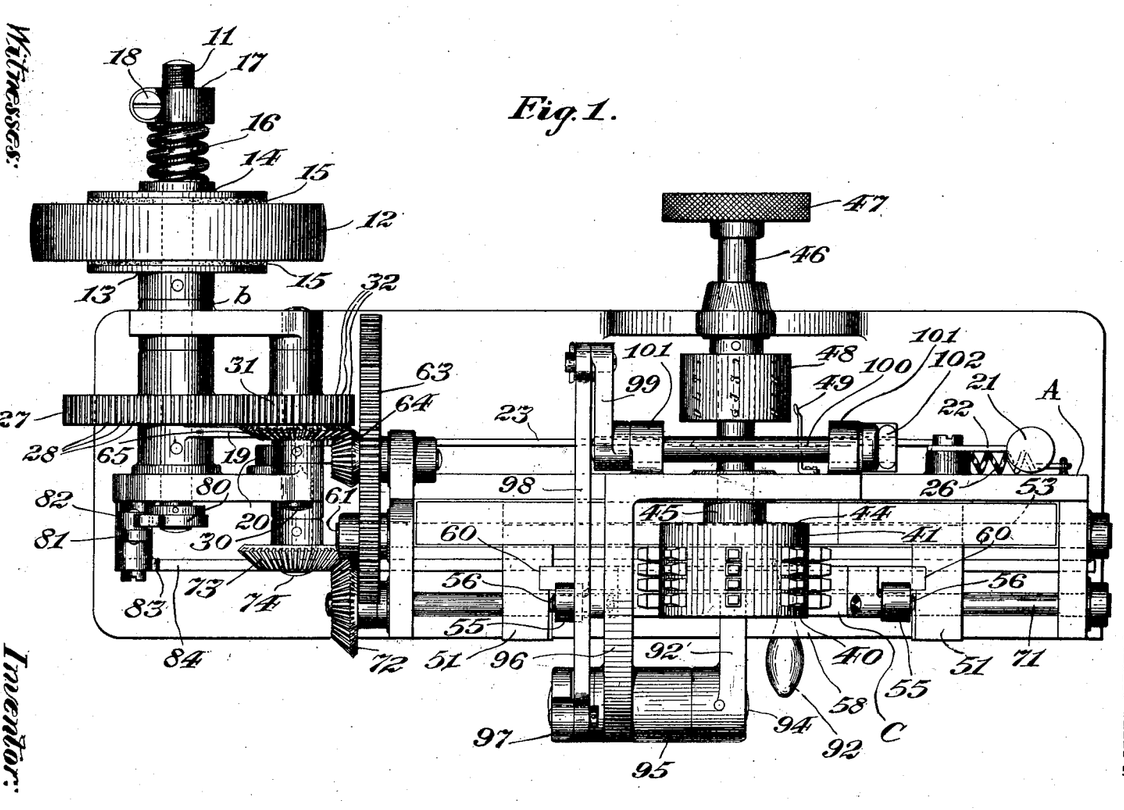
Figure 1 is a top view.
Figure 2:
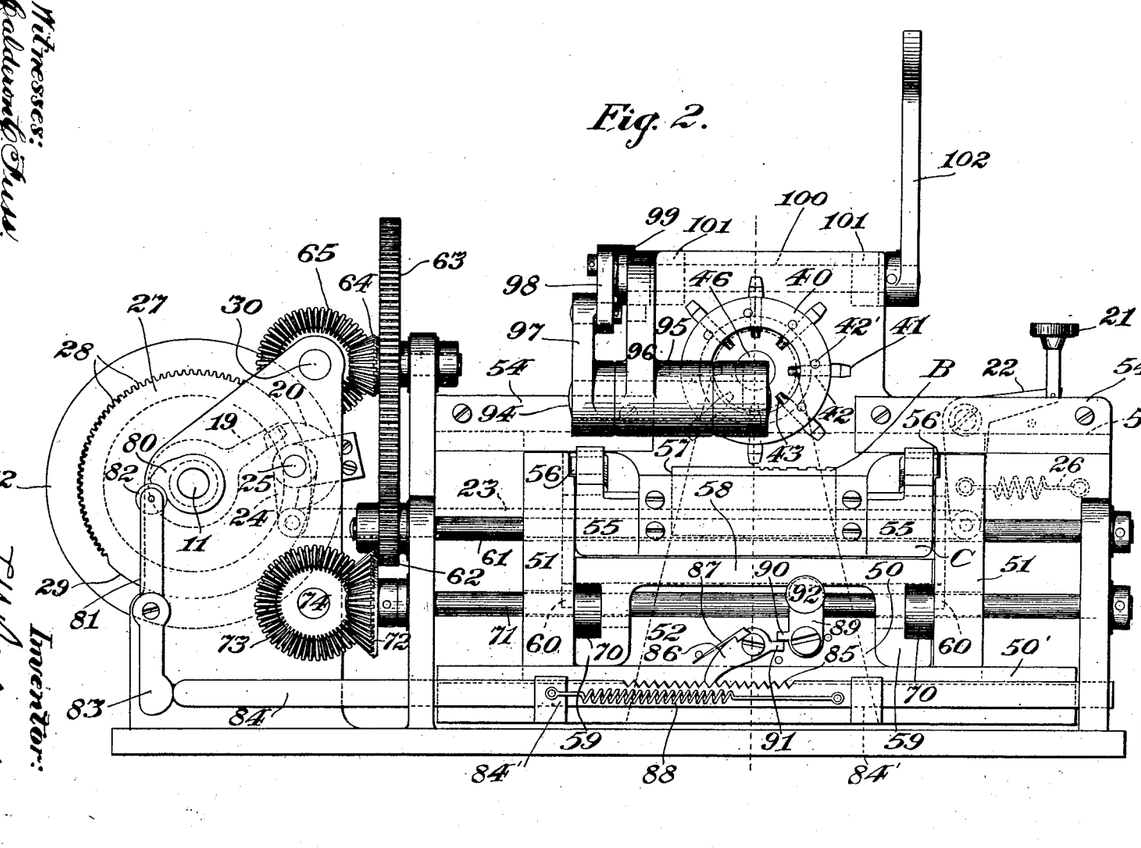
Fig. 2 is a front elevation.
Figure 3:
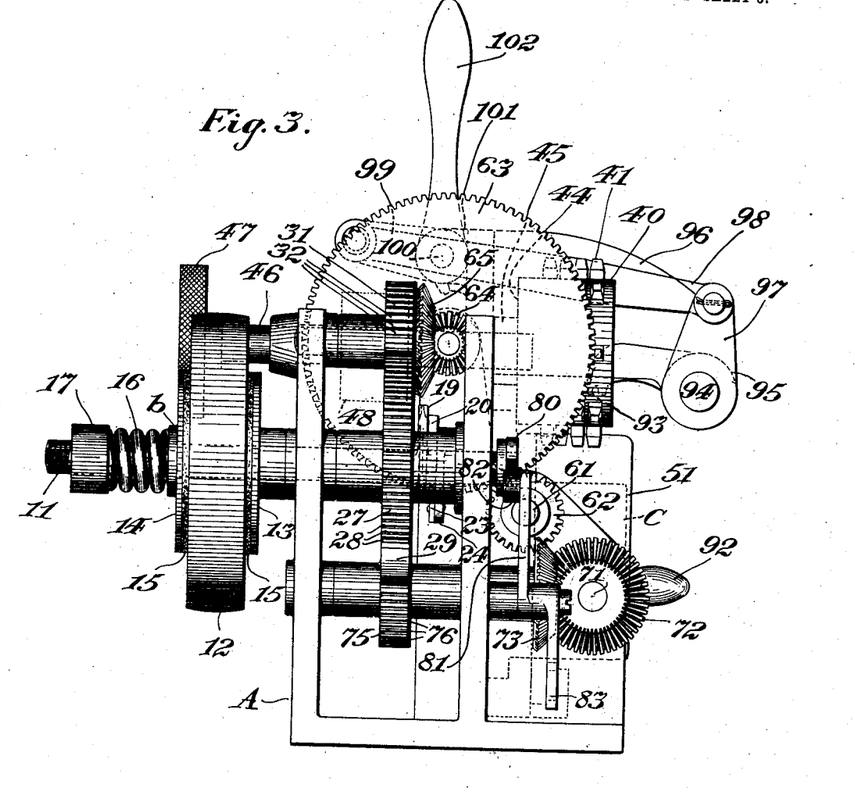
Fig. 3 is an end elevation looking toward the left in Fig. 1.
Figure 4:
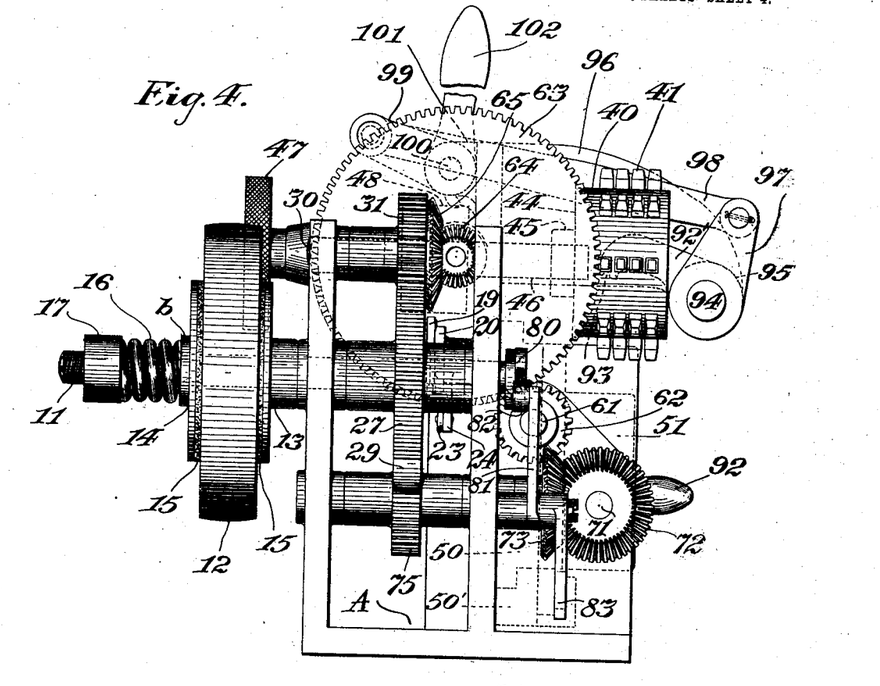
Fig. 4 is a like view in a different position.
Figure 5:
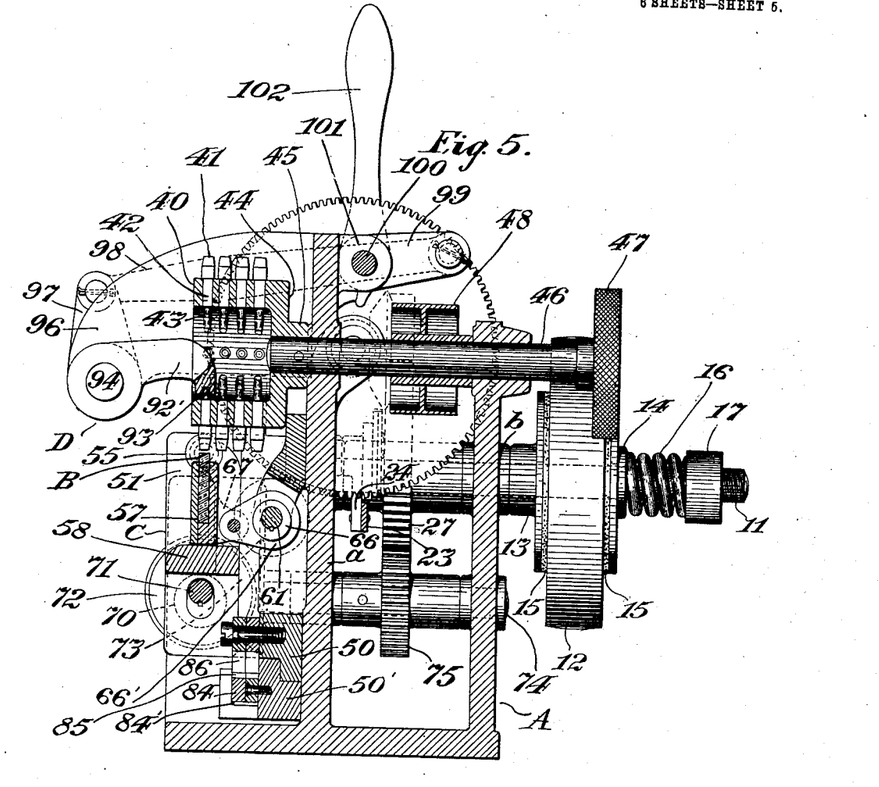
Fig. 5 is a vertical section on the line a—a of Fig. 2 looking toward the left.
Figure 6:
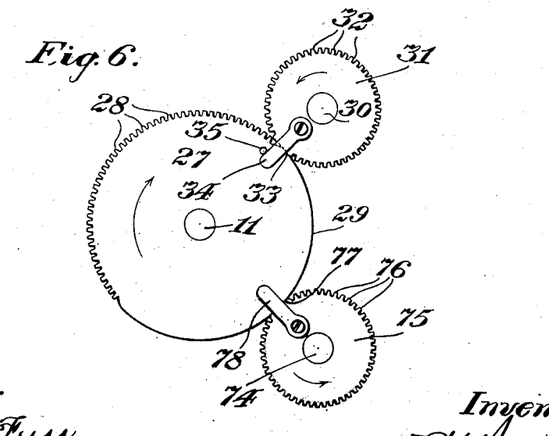
Fig. 6 is a detail showing the arrangement of a train of intermittent driving-gear.
Figure 7:
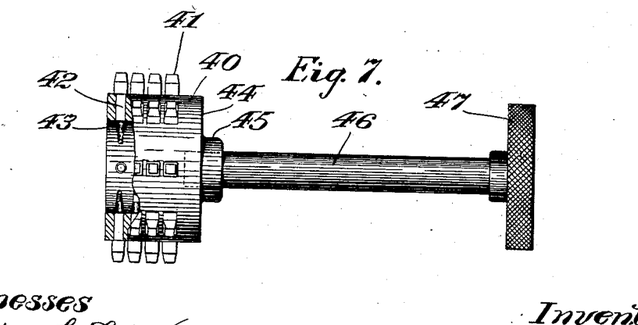
Fig. 7 is a detail of a form of die carriage or carrier.
Figure 8:
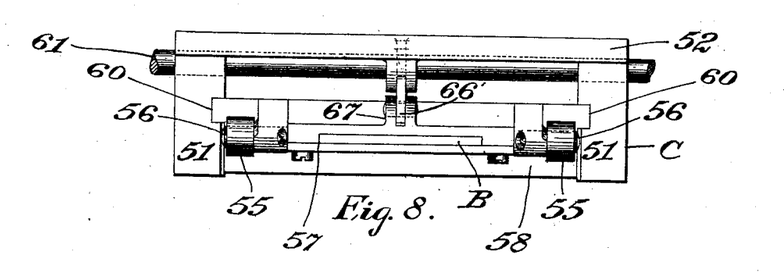
Fig. 8 is a plan view of a blank carriage.
Figure 9:
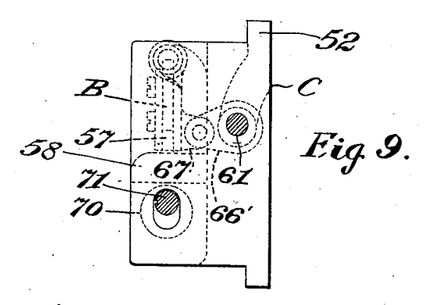
Fig. 9 is an end view thereof.
Figure 10:
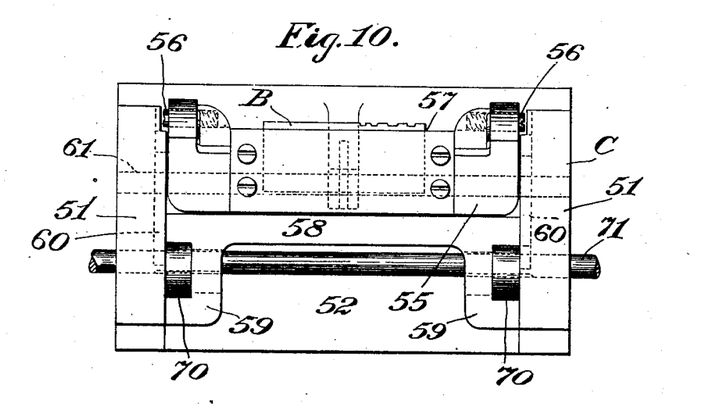
Fig. 10 is a front elevation thereof.

The machine in the present instance is shown as organized for operation upon a typebar-blank, designated in a general way by B. A suitable carriage, designated in a general way by C, may be provided for holding and feeding the blank and in the present instance is shown as comprising a frame composed of a base member 50 mounted upon ways 50' in the bottom of the machine and adapted for longitudinal movement thereon and end members 51 and a back plate 52 mounted in ways 53 formed by plates 54 secured to a central web $a$ of the frame of the machine. If it is desired to impart compound movement to the typebar while forming the impressions thereon suitable means may be employed for holding it upon the carriage. Means are illustrated for oscillating the blank and in the present instance comprise a cradle 55 hung on pivot screws 56 engaging a portion of the carriage but so organized as to permit vertical movement of the cradle. A suitable pocket 57 is provided for the reception of the blank. Beneath the cradle is shown a shelf 58 provided with depending portions 59, which are mounted in ways 60 on the carriage and is organized to raise and lower the cradle while the same is either stationary or oscillating. The means for oscillating the cradle in the present instance comprise a shaft 61 upon which is fast a pinion 62 in mesh with a gear-wheel 63 which is driven by a bevel pinion 64 in mesh with a bevel gear-wheel 65 upon the stub shaft 30, the train of gear being such that the shaft 61 is rotated at a comparatively high rate of speed, upon which shaft is splined an eccentric 66 embraced by an eccentric link 66' pivotally connected to a lug 67 upon the cradle. For the purpose of raising the shelf and the cradle suitable cams or eccentrics 70 are shown as splined upon a shaft 71 having a bevel-gear 72 fast thereon and in mesh with the bevel-gear 73 fast upon a shaft 74 which is provided with a gear-wheel similar to gear-wheel 31, which comprises a wheel 75 provided with teeth 76 upon the major portion of its periphery and a plain concave portion 77 and a finger 78. A form of gear found suitable for practical purposes is illustrated in Fig. 6 and is so organized that the cradle will be rapidly oscillated before the toothed portion of the periphery of wheel 27 engages the teeth of the wheel 75 to rotate the shaft 71 and raise the cradle. The gearing is such that the shaft 71 will be given one complete revolution for each revolution of the wheel 27; the oscillation of the cradle having ceased before the cradle is lowered by the plain portion of the wheel 27 having come to the plain portion of the wheel 31 and after the wheel 27 has come to such a position that the plain portion of its periphery is just about to pass the plain portion of the periphery of wheel 31 and start the same again rotating the arm 19 will be engaged by the escapement 20 and the parts be brought to rest, permitting the friction pulley to run idly.

The carriage upon each impression may be moved forward a step. Suitable mechanism is shown therefor which comprises a cam 80 mounted upon the driving-shaft 11 and adapted to engage upon each revolution of wheel 27 with an arm of a lever 81 provided with an antifriction-wheel 82. The lower end of lever 81 may be provided with an antifriction head 83 adapted to reciprocate a bar 84 supported in guides 84' provided with a rack 85 adapted to engage a pawl 86 pivoted upon the carriage, a suitable spring 87 being provided for maintaining the pawl against the rack and a suitable spring 88 fastened to the bar 84 and to one of the guides 84' therefor to return the bar to its normal position after the excursion imparted to it by its cam. The carriage is thus positively advanced by the main driving-shaft at each rotation thereof. When it is desired to return the blank-carriage to its initial position or to move it backward the pawl may be tripped by means of an arm 89 pivoted upon the carriage and carrying a lug 90 which will engage a lug 91 upon the pawl and trip the same, a crank or handle 92 being provided for the purpose of operating the same.

Owing to the compound action of the type-blank it is desirable to employ some efficient means for holding the die which is at the working point absolutely stationary, for which purpose suitable means may be employed, designated in a general way by D, and which in the present instance comprises an arm 92 adapted to enter the interior or hollow portion of the die-carrier or head and provided with an opening 93 adapted to engage the lug or projecting end of any of the dies and to hold the die which is at its working point in such position, and for the purpose of positioning with precision such working die the end of it may be made conical and the opening in the arm be made conical so that any slight variation in the position may be corrected before the operation of the die upon the blank commences. The arm 92 is shown as mounted upon a rock-shaft 94 having bearings in a boss 95 carried by an arm 96 upon the framework of the machine.

Mounted upon the rock-shaft 94 is a crank 97 pivoted to a pitman 98, which is in turn pivoted to a crank 99 mounted upon a rock-shaft 100 journaled in suitable bearings 101 in the framework of the machine, which shaft is adapted to be rocked by means of a lever or handle 102. The various connectors between the handle 102 and the arm 92 are such that actions after the analogy of toggles are had, this system of linkage being such that the arm 92 after it is forced down and engages the protruding end of the die will be locked in such engaging position and pressure in the direction of the axis of the die will not raise the arm and the oscillation of the blank against the die will not impart motion to the die nor move the arm, but upon desiring to release the die the rocking of shaft 100 will throw the linkage in such position that the arm 92 may be readily raised and the die released.

What I claim as my invention and desire to secure by Letters Patent is:—

1. The combination of a series of dies; means for moving the dies to bring a selected die into working position; means for individually holding the die brought to the working position; means for holding or carrying the work for such dies; and means for imparting movements to the work while at the working point of the die.

2. The combination with a series of dies, of means for bringing any die of the series into the general working point; means for precisely positioning and accurately holding the die so brought to position; means for advancing the work to the die; and means for causing movements of the work while at the working point of the die.

3. The combination with a series of dies arranged in circular formation and in rectilinear arrangement; means for imparting circular and rectilinear movements to the series so that each die thereof may be brought to a universal working point; means independent of the carrier for positively engaging a selected die which may be brought to the working point and holding such die against the thrust of its work; and means for advancing and oscillating the work toward the die.

4. The combination with a cylindrical head; dies mounted thereon in several rows around the perimeter of the head; means for rotating and for reciprocating the head; means for oscillating and advancing the work to the dies; means operative within the head for positively sustaining the head against the thrust due to the advance upon the die of its work; and means to actuate the same.

5. The combination with a cylindrical head; dies mounted thereon in several rows around the perimeter of the head; means for rotating and for reciprocating the head; means for presenting the work to the dies by a combined advancing and oscillating movement at the working point; and means operative within the head for sustaining the head against the thrust due to the compound advance upon the die of its work.

6. The combination with a hollow cylindrical head, of a series of dies rigidly mounted thereon, each die having a boss or lug projecting within the cylinder; an arm for engaging the boss or lug of the die which is at the working point; means for actuating the same; means for locking the same; and means for bringing the die and its work into contact, by a combined advancing and oscillating movement.

7. The combination with a series of dies, each comprising a die face and a stem; a plate to which the dies are fast and through which the die stems protrude; means for moving the plate to bring a selected die into working position; a member for engaging the end of the stem of the die at the working position; means for actuating and locking the engaging member; and means for causing the die and its work to contact, by a combined advancing and oscillating movement.

8. The combination with a die-carrier, of a series of dies each provided with a stem having a tapered end, the die-stems mounted fast in the carrier and their tapered ends protruding therethrough; an arm provided with a flaring opening mating with the tapered ends to precisionize the die carrying the engaged stem; means for actuating the arm to mate with the tapered end of a selected die and to lock the arm; and means for bringing the die and its work into contact, by a combined advancing and oscillating movement.

9. The combination with a die-carrier, of a series of dies each provided with a stem having a tapered end, the die-stems mounted fast in the carrier and their tapered ends protruding therethrough; an arm provided with a flaring opening mating with the tapered ends and adapted to precisionize the die thereby; means for actuating the arm to mate with the tapered end of a selected die and to lock the arm; and means comprising a cam and an eccentric for bringing the die and its work into contact by a combined advancing and oscillating movement.

10. The combination with a die-carrier, of a series of dies mounted thereon; a conical boss above each die; an arm provided with a conical recess adapted to engage the boss of the die at the working point; means for pressing the arm upon the boss for precisely positioning and holding the die; toggles for locking the arm in such position; and means for advancing the work toward the die.

11. The combination with a die-carrier, of a series of dies mounted thereon; a conical boss above each die; an arm provided with a conical recess adapted to engage the boss of the die at the working point; means for pressing the arm upon the boss for precisely positioning and holding the die; toggles for locking the arm in such position;

means for advancing the work toward the die; and means for oscillating the work while in engagement with the die.

12. The combination with a die head; of dies carried thereby; means to lock a selected die at the working position; means to press the work toward the die so located and to rapidly oscillate the work while in engagement with the die; and means coöperative with the locating means to engage the die head to sustain the same in position during the oscillation of the work.

13. The combination with a die head; of dies carried thereby; means to locate a selected die at the working position; means to press the work toward the die and to cause the same to oscillate about an axis at the point of contact between the work and the die; and means coöperative with the locating means to engage the die head to sustain the same in position during the oscillation and pressing of the work.

14. The combination with a series of dies, of means for moving a selected die into position; means for engaging a portion of the die and precisely positioning the same; means for locking the engaging means to sustain the die against its work; means for pressing the work toward the die; and means for oscillating the work before it contacts with the die and for stopping the oscillation before the work and die cease to be in contact.

15. The combination with a series of dies, of means for moving a selected die into position; means for engaging a portion of the die and precisely positioning the same; means for locking the engaging means to sustain the die against its work; cam-actuated means for pressing the work toward the die; eccentric-actuated means for oscillating the work; and mutilated gears for commencing the oscillation of the work before it contacts with the die and for stopping the oscillation before the work and die cease to be in contact.

16. The combination with a series of dies each provided with a tapered end; an arm provided with a flaring mouth; means for bringing each of the dies under the flaring mouth of the arm; means for lowering the arm upon the tapered end of the die; means for locking the arm; means for advancing work against the die and withdrawing the same therefrom; and means for oscillating the work prior to and during the greater period of its contact with the die and for stopping the oscillation prior to the withdrawal of the work therefrom.

17. The combination with a series of dies each provided with a tapered end; an arm provided with a flaring mouth; means for bringing each of the dies under the flaring mouth of the arm; means for lowering the arm upon the tapered end of the die; means for locking the arm; means for advancing work against the die and withdrawing the same therefrom; means for oscillating the work prior to and during the greater period of its contact with the die and for stopping the oscillation prior to the withdrawal of the work therefrom; and means for locking the work upon cessation of oscillation.

18. The combination with a die, of means for advancing work against the die and withdrawing the same therefrom; and means for oscillating the work prior to and during the greater period of its contact with the die and for stopping the oscillation prior to the withdrawal of the work therefrom.

19. The combination with a die, of means for advancing work against the die and withdrawing the same therefrom; means for oscillating the work prior to and during the greater period of its contact with the die and for stopping the oscillation prior to the withdrawal of the work therefrom; and means for locking the work upon cessation of oscillation.

20. The combination with a series of dies, of means for moving a selected die into position; cam-actuated means for pressing the work toward the die; eccentric-actuated means for oscillating the work; and mutilated gears for commencing the oscillation of the work before it contacts with the die and for stopping the oscillation before the work and die cease to be in contact and for locking the parts in their idle positions.

21. The combination with a series of dies, of a carrier therefor comprising a hollow cylindrical head; means for moving the head to bring any die into the working position; a carriage; a cradle mounted thereon; a blank-holder upon the cradle; a driving pulley mounted upon a shaft with which it is in frictional contact; means for holding the shaft stationary; means for releasing the shaft to the influence of the pulley at will; a mutilated gear-wheel upon the shaft; cams for raising the carriage mounted upon a shaft; a gear upon the cam-shaft in mesh with a mutilated gear meshing with the mutilated gear on the driving-shaft; an eccentric for rocking the cradle mounted upon a shaft; a gear mounted upon the eccentric-shaft and in gear with a mutilated gear in mesh with the mutilated gear on the driving-shaft and organized to be driven faster than the cam-shaft and to commence the oscillation of the cradle before the cam-shaft raises the same and to cease its oscillation before the cam-shaft lowers the same and to lock the parts in their idle positions; and means for advancing the carriage step by step.

22. The combination with a series of dies, of a blank holder, means for shifting a selected die into its general working position relative to said blank holder, means for effecting a working movement between the selected die and the blank holder, and means actuated independently of said shifting means and said movement effecting means for engaging the selected die and precisionizing the same into its exact working position and for exerting a pressure upon such die for powerfully maintaining it at its precisionized position.

23. The combination with a series of dies, of a blank holder, means for shifting a selected die into its general working position relative to said blank holder; means for effecting a working movement comprising a relative advance of the blank toward the die, and means actuated independently of said shifting means and movement effecting means and movable in a direction opposite to the blank movement for engaging the selected die and exerting pressure upon it for precisionizing such die into its exact working position and for maintaining it at such precisionized position against the thrust from its work.

24. The combination with a reciprocatory and rotary die-carrier, of a series of dies carried thereby operative when in a fixed position, a blank-carrier organized to impart movement to a blank while at the working point of the dies, means for bringing a die to its working position, and independent means for sustaining the working die in a fixed position during the movement of the blank.

25. The combination with a die for operating upon a blank, means for moving a blank while at the working point of the die, and means to engage the die in binding contact for sustaining the same against the influence of such movement.

26. The combination with a number of dies for producing impressions upon blanks, of means to bring a selected die to working position, means to oscillate a blank while at the working position of such die, and means to clamp the working die to sustain the same against the influence of such working movement of the blank.

27. The combination with a number of dies each for producing an impression upon a blank, means for moving a selected die into working position, means for oscillating a blank while at the working point of the die, and means for clamping and maintaining the die in a fixed position while at its working position.

28. The combination with a number of dies each for producing an impression upon a blank; means for moving a selected die into working position; means for causing compound movements of a blank while at the working point of the die such movements comprising an advance of the blank toward the die and during such advance an oscillation across the line of such advance, and means for maintaining the die in a fixed position while at its working position.

29. The combination with a plurality of dies for producing impressions upon blanks, means for selecting and moving axially and slidably into its working position a die, and a single instrumentality operable upon every die individually after it has been moved into its working position for maintaining it rigidly in its working position.

30. The combination with means for holding a blank and advancing and oscillating the same, of a plurality of dies severally capable of being moved into position to contact with the blank while it is being advanced and oscillated, and means for sustaining the working die against the thrust of advance and oscillation.

31. The combination with a carriage; means thereon for supporting a type-blank; cams for raising and lowering the carriage; an eccentric for oscillating the same; and means for contemporaneously actuating the cams and the eccentric.

32. The combination with a carriage; means thereon for supporting a blank; means for raising and lowering the carriage; and means for oscillating the blank-supporting means a number of times during the raising of the carriage.

33. In a typographic-machine, the combination with ways upon the machine, of a carriage riding in such ways; means upon the carriage for supporting a type-blank; means for raising and lowering the entire carriage; and means for oscillating the blank-carrying portion of the carriage on an axis in the general line of the impression-receiving portion of the blank.

34. In a typographic-machine, the combination with ways, of a member movable in the ways; a cam-shaft; cams thereon for moving the member in the ways; a shelf on the member transverse to the line of movement induced by the cams; a blank-holder resting upon the shelf and pivoted at a distance above such shelf; and means for oscillating the holder upon such pivots and back and forth across the shelf.

35. In a typographic-machine; a carriage embodying a portion for carrying and holding a blank; and means for moving the entire carriage and for oscillating the holding portion only during a portion of such movement.

36. In a device of the character specified, the combination with a die; a carriage for holding a blank; means for raising and lowering the carriage; a cradle upon the carriage pivoted thereto in a line substantially coincident with the impression-receiving line of the supported blank; a support upon the carriage for the lower end of the cradle and affording support thereto on a line with the working face of the die and the advance of the carriage; means for rocking the cradle upon its axis; a driving-pulley; a driving-shaft; means for frictionally driving the shaft from the pulley; means for stopping the arm and holding the shaft in a stationary position; means for releasing the shaft; a rack-bar below the carriage; a pawl carried by the carriage and in engagement with the rack-bar; means for tripping the pawl; a lever for causing excursions of the rack-bar; a cam upon the shaft for actuating the lever; a spring for returning the rack-bar, the organization being such that the carriage will be moved forward one step at each rotation of the shaft; a driving-wheel fast upon the shaft and provided upon its periphery with a plain portion and a toothed portion; a pair of wheels each provided with a toothed portion and a concave portion adapted to ride upon the plain portion of the driving-wheel; a finger upon each of said wheels; a lug upon the driving-wheel adapted to contact with each finger for successively bringing the teeth of such wheels into mesh with the toothed portion of the driver; a train of high-speed gear between the wheel first to be set in motion and the cradle-rocking means; and a train of low-speed gear between the wheel second to be set in motion and the raising and lowering means, whereby the cradle will be rocked prior to the raising of the carriage and locked prior to lowering thereof.

37. In a device of the character specified, the combination with a series of dies having a universal working point and means to selectively locate the dies thereat, of a carriage for holding a blank, means for oscillating the blank, and means for advancing the carriage comprising an engaging member upon the carriage, a rack-bar supported adjacent thereto, a lever for causing excursions of the rack-bar, means for returning the rack bar after each excursion, and a cam upon the shaft of the machine for actuating the lever; the organization being such that the carriage is advanced along the rack bar.

38. In a device of the character specified, the combination with a carriage for supporting the work of the machine; means for raising and lowering the carriage; means for imparting other movements to another portion of the carriage; and a train of mutilated gears comprising portions for effecting each of said motions and for locking the respective parts against such motions.

39. The combination with means for holding a die at its working position, of means for holding a blank to be worked upon by the die; means for advancing the holding means and for imparting a second movement thereto and comprising a shaft for each of the respective movements; a driving-shaft frictionally driven; means for holding the driving-shaft stationary; means for releasing the driving-shaft; a driving-wheel fast upon the shaft having a portion of its periphery plain and a portion thereof provided with gear teeth; a wheel adjacent thereto for driving each shaft and provided with gear teeth similar in number to the teeth upon the driving-wheel; and a short concave portion adapted after the teeth of the wheel have run over the teeth of the driver to ride upon the plain portion of the periphery of such driver and lock the wheel; and means carried by the driver and the wheel for causing the teeth of the wheel to engage the teeth of the driver, the organization being such that one of such movements will be imparted to the holder prior to the inauguration of the other of such movements and it will be locked against such movement prior to the completion of the other of the movements.

40. The combination with a carriage for holding a blank; means for raising and lowering the carriage; a cradle upon the carriage pivoted thereto in a line substantially coincident with the impression-receiving line of the supported blank; a support upon the carriage for the lower portion of the cradle and affording support thereto on a line with the working face of the die and the advance of the carriage; and means for rocking the cradle upon its axis.

41. In a typographic-machine, the combination with a plurality of dies arranged in several circular rows and in transverse rows across the circles, a carrier therefor, said dies rigidly fixed in said carrier of means for concurrently imparting to the entire body of dies movements in the plane of the circular rows and movements transverse to the plane of such rows for bringing a selected die to a working point.

42. In a typographic-machine, the combination with a plurality of dies arranged in several circular rows and in transverse rows across the circles, of means for imparting to the entire body of dies movements in the plane of the circular rows and movements transverse to the plane of such rows for bringing a selected die to a working point, and toggle construction to coöperate with the head for sustaining and positioning the die which is brought to its working point.

43. The combination with a die head of hollow cylindrical construction; a series of dies arranged upon the perimeter of the head in rows parallel with the axis of the cylinder and in rows transverse thereto; means for imparting rotary and axial movement to the head for the purpose of bringing any die to and holding the same at a universal working point; means within the head for engaging it to coöperate with said means to support and position the die at the working point; and toggle construction for actuating and locking such supporting means.

44. In a device of the character specified, the combination with a series of dies having a universal working position and means to selectively locate the dies thereat, of a carriage for holding a blank; means to shift the carriage and comprising an engaging member thereon, a rack bar reciprocatable parallel with the line of movement of the carriage, and means for reciprocating such rack bar with short excursions, the organization being such that an excursion of the rack bar in one direction will coöperate with said engaging member and advance the carriage a step and on the return excursion said member will be out of working engagement with said bar.

45. The combination with a die head, of dies carried by the head and immovable relative thereto, means for shifting the head for locking a selected die at the working position, means for pressing the work toward the die and causing the same to oscillate about an axis at the point of contact between the work and the die, and means for engaging the die head to sustain the same in position during the oscillation and pressing of the work.

46. The combination with a die head, of dies carried thereby, means for shifting the head for locking a selected die at the working position, means for pressing the work toward the die and causing the same to oscillate, and means for engaging the die head and sustaining the same in position during the oscillation and pressing of the work.

47. The combination with a cylindrical head, of a series of dies carried by the head and immovable relative thereto, each die having a boss or lug projecting within the cylinder, and an arm for engaging the boss or lug of the die which is at the working point.

48. The combination with a hollow cylindrical head, of a series of dies carried by the head and immovable relative thereto, each die having a boss or lug projecting within the cylinder, an arm for engaging the boss or lug of the die which is at the working point, means for actuating said arm, means for locking the arm, and means for bringing the die and its work into contact.

49. The combination with a hollow head, of a series of dies carried by the head and each having its working portion upon the outside thereof, and an end projection within the head, means for shifting the head for bringing a selected die to the working position, and means for engaging the inward projection of the die which is brought to the working position, means for locking the engaging means, and means for bringing the die and its work into engagement.

50. The combination with a die carrier, of a series of dies each provided with a stem having a tapered end, the die stems being mounted in the carrier and immovable relative thereto, their tapered ends projecting through the carrier, an arm provided with a flaring opening mating with the tapered ends to precisionize the die having the engaged stem, means for actuating the arm to mate with the tapered end of a selected die and lock the same, and means for bringing the die and its work into working engagement.

51. The combination of a die carrier, of a series of dies each with a stem having a tapered end, the die stems being mounted in the carrier and immovable relative thereto, and the tapered ends protruding therethrough, an arm provided with a flaring opening for mating with the tapered ends and adapted to precisionize the dies, means for actuating the arm to mate with the tapered end of a selected die and to lock the arm, and means comprising a cam and an eccentric for bringing the die and its work into working engagement.

In testimony whereof, I have hereunto signed my name at Nos. 9–15 Murray st., New York, N. Y., this 17th day of October, 1902.

FRANCIS H. RICHARDS.

Witnesses:
PIERSON L. WELLS,
JOHN O. SEIFERT.